UNITED STATES PATENT OFFICE.

GEORGE GATEWOOD MULLINS, OF LOS ANGELES, CALIFORNIA, ASSIGNOR TO THE MULLINS SILICATED IRON AND STEEL COMPANY, OF EAST ST. LOUIS, ILLINOIS.

PROCESS OF PURIFYING IRON.

SPECIFICATION forming part of Reissued Letters Patent No. 10,988, dated February 26, 1889.

Original No. 370,401, dated September 27, 1887. Application for reissue filed February 21, 1888. Serial No. 264,875.

*To all whom it may concern:*

Be it known that I, GEORGE GATEWOOD MULLINS, a citizen of the United States, residing at Los Angeles, in the county of Los Angeles and State of California, have invented certain new and useful Improvements in Processes of Purifying Iron, of which the following is a specification.

This invention relates to a process of purifying, hardening, and otherwise greatly improving iron, all of which will be more fully hereinafter described, and pointed out in the claims.

This invention consists, essentially, in the use of silica ($SiO_2$) in the treatment of iron. Silica is a very pure quartz found in great abundance at many places in the country—for instance, near Chattanooga, Tennessee, in the Ozark range, in the Cumberland Mountains, in the Rocky Mountains, and as also found at some places in the form of nearly-pure silicious sand. By a large number of experiments I have found that silica in this common form, after being crushed to a powder and fused to a liquid state, has a strong affinity for sulphur, phosphorus, and arsenic, and as a physic and detergent carries off these enemies from the molten and thoroughly-worked or well-puddled iron, leaving the iron purer than that produced in any other manner. I have also found that the silica, being to some extent reduced, in greater or less degree combined with the purified or liquid iron, and in some way acted upon the iron so as to change its quality, greatly improves its character, rendering it a hard, tough, and steel-like iron, which, for want of a better name, I venture to call "silicated iron."

The process is as follows: The puddling-furnace is charged with the cast or pig iron of commerce. It is reduced to a molten state and brought to the highest white heat possible, and when in that condition the powdered silica, in weight from five to twenty-five per cent (5% to 25%) of the weight of the iron, varying according to the known impurity of the iron, is introduced. The mass is most thoroughly puddled, and allowed to boil or simmer a few minutes until certain blue and greenish flames are emitted from the boiling mass, when the metal is worked out and manipulated in the usual manner.

To make a still more highly improved product I repeat the same process upon the iron already having been once subjected to the treatment.

It has been found in actual practice that when the powdered silica is introduced while the mass is boiling, and at most intense heat, not only are the sulphates, phosphates, and other impurities removed with the scoria, but, beyond doubt, during the puddling of the mass at highest possible temperature (and the more powerful the furnace the better) the silica is to some extent reduced, and in greater or less degree is combined with the purified liquid iron. The result is not pure "silicide of iron," but possibly a "silicide," or "silicated iron," or whatever it may be styled, certainly a hard tough steel-like iron or semi-steel which by numerous working tests has been proved to have many admirable qualities.

The principal features of this invention are the simple use of powdered silica, when the silica is to be introduced, how it may thus be readily fused and melted and made to combine with the molten mass of iron to eliminate therefrom the impurities, and at the same time imparting in some way (professedly not understood) such quality of itself and such properties as to form the product silicated iron, semi-steel, or greatly improved metal, above referred to.

I do not claim the use of silica in combination with any other substances such as have been heretofore employed as physic, flux, detergent, or alloy; but What I do claim is—

1. The process of purifying and improving iron by the introduction to the melted mass of iron, at the proper heat, of pulverized silica, which consists in adding silica when the iron is at a suitable white heat, subsequently puddling the charge until blue and green flames are emitted, then finally working the metal in the usual manner, substantially as and for the purpose described.

2. That improvement in the manufacture of iron which consists in adding silica to the molten iron when the latter is at a proper heat, as set forth.

In testimony whereof I affix my signature in presence of two witnesses.

GEORGE GATEWOOD MULLINS.

Witnesses:
F. D. PETERS,
W. R. BURKE.